United States Patent [19]

Tomczuk et al.

[11] Patent Number: 5,711,019
[45] Date of Patent: Jan. 20, 1998

[54] METHOD FOR TREATING ELECTROLYTE TO REMOVE Li$_2$O

[75] Inventors: Zygmunt Tomczuk, Lockport; William E. Miller, Naperville; Gerald K. Johnson, Downers Grove; James L. Willit, Batavia, all of Ill.

[73] Assignee: The United States of America as represented by the United States Department of Energy, Washington, D.C.

[21] Appl. No.: 594,974

[22] Filed: Jan. 31, 1996

[51] Int. Cl.$^6$ ............................ A62D 3/00; C01D 15/00
[52] U.S. Cl. ............................ 588/201; 423/179.5
[58] Field of Search ............... 423/179.5, 201, 423/600, 119; 588/201; 205/364, 538, 557

[56] References Cited

U.S. PATENT DOCUMENTS

| | | | |
|---|---|---|---|
| 4,242,192 | 12/1980 | Dunning, Jr. et al. | 204/213 |
| 4,251,338 | 2/1981 | Retallack | 423/179.5 |
| 4,596,647 | 6/1986 | Miller et al. | 204/212 |
| 4,761,266 | 8/1988 | Bruski | 420/528 |
| 4,855,030 | 8/1989 | Miller | 204/212 |
| 4,880,506 | 11/1989 | Ackerman et al. | 204/1.5 |
| 4,995,948 | 2/1991 | Poa et al. | 204/1.5 |
| 5,009,752 | 4/1991 | Tomczuk et al. | 204/64 R |
| 5,131,988 | 7/1992 | Peterson | 204/68 |
| 5,348,626 | 9/1994 | Miller et al. | 204/1.5 |
| 5,356,605 | 10/1994 | Tomczuk et al. | 423/251 |
| 5,531,868 | 7/1996 | Miller et al. | 205/44 |

*Primary Examiner*—Ngoclan Mai
*Attorney, Agent, or Firm*—Lisa M. Golke; Mark P. Dvorscak; William R. Moser

[57] ABSTRACT

A method of removing Li$_2$O present in an electrolyte predominantly of LiCl and KCl. The electrolyte is heated to a temperature not less than about 500° C. and then Al is introduced into the electrolyte in an amount in excess of the stoichiometric amount needed to convert the Li$_2$O to a Li-Al alloy and lithium aluminate salt. The salt and aluminum are maintained in contact with agitation for a time sufficient to convert the Li$_2$O.

16 Claims, No Drawings

METHOD FOR TREATING ELECTROLYTE TO REMOVE Li₂O

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a method of purifying LWR and IFR electrolyte salt by removing lithium oxide dissolved therein.

Electrorefining has been used in processes for recovering uranium and plutonium metals from spent nuclear fuel. The electrorefining is performed in an electrochemical cell in which the chopped fuel elements from the reactor forms the anode, the electrolyte, preferably, is the fused eutectic salt of the LiCl-KCl which contain $UCl_3$ and $PuCl_3$. Purified metal is recovered at the cathode. In some designs, the metal collected at the cathode collects at the bottom of the cell. In general, electrorefining processes have been disclosed in the Hansen U.S. Pat. No. 2,951,793 issued Sep. 6, 1960, and in the Miller et al. U.S. Pat. No. 4,596,647 issued Jun. 24, 1986. Other patents which are of interest to the subject invention are U.S. Pat. No. 4,596,647 issued Jun. 24, 1986, U.S. Pat. No. 4,855,030 issued Jun. 8, 1989, U.S. Pat. No. 4,995,948 issued Feb. 26, 1991, U.S. Pat. No. 5,009,752 issued Apr. 23, 1991 and application Ser. No. 267,949 filed Jul. 6, 1995, assigned to the assignee hereof, the disclosures of which are herein incorporated by reference.

The electrorefining process may use an anode pool of cadmium metal such as disclosed in the Hansen patent, or a moveable anode basket device as disclosed in the Miller et al. patent, or a combination thereof. Because small amounts of oxygen are inadvertently introduced into the electrorefiner, uranium dioxide and plutonium dioxide are formed over a period of years.

SUMMARY OF THE INVENTION

Briefly, the invention is directed to a method of removing lithium oxide from the electrolyte salt used in an electrorefining of spent nuclear fuel and particularly in removing lithium oxide from LWR and IFR electrolyte salt. More particularly, the invention involves contacting the electrolyte containing the lithium oxide with aluminum, which can be in the form of a aluminum-lithium alloy or pure aluminum to form a lithium-aluminate and free lithium. The free lithium would then react with aluminum to form a solid lithium-aluminum alloy (α-Al, or α+beta LiAl or some combination of both).

Accordingly, it is an object of the invention to convert the lithium oxide present in electrorefining electrolyte to solid lithium aluminum alloys or to a lithium aluminate by contacting the salt with aluminum.

Another object of the invention is to provide a method for recovering lithium oxide dissolved in electrolyte salt by mixing the electrolyte salt with particulate aluminum at a temperature in excess of about 650° C. for a period of over 5 hours in order to remove the lithium oxide from the salt.

The invention consists of certain novel features and a combination of parts hereinafter fully described, and particularly pointed out in the appended claims, it being understood that various changes in the details may be made without departing from the spirit, or sacrificing any of the advantages of the present invention.

DETAILED DESCRIPTION OF THE INVENTION

LWR fuel is a metal oxide fuel which must be reduced before it can be processed and incorporated into the metallic IFR fuel. The preferred method utilizes lithium metal to reduce the oxide to metal in an electrolyte salt. The lithium is converted to $Li_2O$ which is soluble in the salt. The reduced metal is then separated from the salt and transferred to an electrorefiner. Because the metal is wetted by the salt, a small amount of salt, with its dissolved $Li_2O$ is also transferred to the electrorefiner. The lithium oxide reacts with the uranium metal to form $UO_2$ and lithium metal. In addition to the lithium oxide, the reduced metal which is transferred into the electrorefiner may contain some lithium metal. Unfortunately, it has been found extremely difficult to remove all of the lithium oxide or lithium metal entrained in the salt or with the uranium.

During the course of an experiment to electro-refine uranium produced by reacting $UO_2$ with lithium, we found that we were unable to do so because the feed stock material also contained lithium oxide entrained with uranium and lithium chloride-potassium chloride material. Since our electrorefiner contained cadmium, the reaction favored uranium dioxide, $U + 2Li_2O \rightarrow UO_2 + 4Li$.

The above reaction was favored because the lithium activity is greatly reduced in the presence of cadmium.

We have found a way to eliminate $Li_2O$ from the electrolyte and thus prevent the formation of $UO_2$ when cadmium is present. The approach is to treat electrolyte containing $Li_2O$ with Al with perhaps some small amount of Li-Al alloy to form a lithium-aluminate (perhaps $LiAlO_2$) and free lithium. The free lithium then reacts with Al to form a solid Li-Al alloy (either α-Al, α+β LiAl or some combination of both).

This approach also can be used to treat the initial electrolyte in the IFR Program. The LiCl-KCl eutectic can be treated with Li to convert water and hydroxides to $Li_2O$. The $Li_2O$ is then removed as described above.

We have experimental confirmation of this approach. In this experiment, 3.6 g $Li_2O$ dissolved in 200 g LiCl -KCl eutectic and 79 g LiCl was contacted for 5 hours with a mixture containing 9.75 g Al and 0.5 g Li. At the end of this time period, the salt was analyzed and found to contain 0.22 wt % $Li_2O$. This value is almost a factor of six lower than that charged (1.27 wt %). This value could have been even lower if additional treatment was undertaken, which it was not, that is, if additional stirring was performed at elevated temperature.

Results of additional experiments performed in this report period, are presented in Table 1. In these experiments, the $Li_2O$ concentration decreased after the aluminum treatment, however, the reduction in $Li_2O$ concentration was similar (0.45–0.62 wt %) even though the $Li_2O$ concentration varied from 0.66 to 3.00 wt %. An important result obtained in these experiments is that the concentration of soluble aluminum species in LiCl were low but higher than hoped for. Nevertheless, the finding of aluminum in the electrolyte does not preclude the reuse of the electrolyte in subsequent reactions with $UO_2$. The concentration of aluminum in LiCl increased with increasing $Li_2O$ concentration, showing a strong functional dependence on the $Li_2O$ concentration in LiCl.

TABLE 1

Results of Experiments with Aluminum

| Experiment | Total Amount of $Li_2O$ added (wt %) before Al-treatment | $Li_2O$ concentration in LiCl (wt %) after Al-treatment | Al concentration in LiCl (wt %) |
|---|---|---|---|
| UR-114 | 0.66 | 0.06 | 0.0044 |
| (150 g LiCl | 1.32 | 0.70 | 0.0207 |
| 0.15 g Li | 1.96 | 1.42 | 0.0626 |
| 3.00 g Al | 3.00 | 2.55 | 0.1440 |
| 650° C.) | | | |

The salt is heated to a temperature of about 500° C. if LiCl KCl eutectic is used, and preferably about 630° C. if LiCl is used. The contact time of the aluminum and the salt is preferably in excess of 2 hours and is best if in the range of between about 4 and about 10 hours. The aluminum should be present in an amount in excess of the stoichiometric amount necessary to convert all of the lithium oxide present to lithium aluminum metal and lithium aluminate. In addition, it is believed that the reaction is surface dependent and therefore the more finely divided the aluminum particles, the more quickly the reaction will occur. The original experiment used the eutectic of lithium chloride and potassium chloride, however, the salt of table 1 was a lithium chloride salt. Accordingly, any halide salt would be satisfactory although it is understood that the electrolyte presently preferred in the IFR electrolytic process is the lithium chloride-potassium chloride eutectic.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of removing $Li_2O$ present in a halide salt, comprising contacting the salt with Al for a time sufficient to convert $Li_2O$ to a Li-Al alloy and a lithium-aluminate salt.

2. The method of claim 1 wherein aluminum is present in an amount greater than the stoichiometric amount needed to convert the lithium oxide present to lithium aluminate and a lithium-aluminum alloy.

3. The method of claim 1 wherein the salt and the aluminum are agitated during the reaction.

4. The method of claim 1 wherein the salt is predominately a mixture of lithium and potassium chloride.

5. The method of claim 1 and further including adding lithium metal to the salt and aluminum mixture.

6. The method of claim 1 wherein the salt and aluminum are in contact for a time ranging from about 2 hours to about 10 hours.

7. The method of claim 1 wherein the salt and aluminum are in contact for time in the range of from about 5 hours to about 10 hours and the temperature is maintained not less than about 500° C.

8. A method of removing $Li_2O$ present in an electrolyte predominantly of LiCl and KCl comprising maintaining the electrolyte at a temperature not less than about 500° C., introducing Al into the electrolyte in an amount in excess of the stoichiometric amount needed to convert the $Li_2O$ to a Li-Al alloy and lithium aluminate salt and maintaining salt and aluminum in contact for a time sufficient to convert the $Li_2O$.

9. The method of claim 8, wherein the electrolyte and Al are agitated during conversion of the $Li_2O$.

10. The method of claim 9, wherein the time is in the range of from about 2 hours to about 10 hours.

11. The method of claim 9, wherein the time is in the range of from about 4 hours to about 10 hours.

12. The method of claim 11, wherein the temperature is maintained not less than about 600° C.

13. The method of claim 4 wherein the salt is heated to a temperature of about 500° C. prior to contacting the aluminum.

14. The method of claim 1 wherein the salt is predominately lithium chloride.

15. The method of claim 14 wherein the salt is heated to a temperature of about 630° C. prior to contacting the aluminum.

16. The method of claim 1 wherein the aluminum is in the form of finely divided aluminum particles.

* * * * *